United States Patent
Phan et al.

(10) Patent No.: US 8,971,262 B2
(45) Date of Patent: Mar. 3, 2015

(54) APPARATUSES, SYSTEM, METHODS, AND COMPUTER PROGRAM PRODUCTS FOR NETWORK CONTROL

(75) Inventors: Vinh Van Phan, Oulu (FI); Ling Yu, Oulu (FI); Markku Vainikka, Kiviniemi (FI); Kari Horneman, Oulu (FI); Klaus Pedersen, Aalborg (DK); Frank Frederiksen, Klarup (DK)

(73) Assignee: Nokia Siemens Networks Oy, Espoo (FI)

( * ) Notice: Subject to any disclaimer, the term of this patent is extended or adjusted under 35 U.S.C. 154(b) by 322 days.

(21) Appl. No.: 13/123,267

(22) PCT Filed: Oct. 10, 2008

(86) PCT No.: PCT/EP2008/063614
§ 371 (c)(1),
(2), (4) Date: Apr. 8, 2011

(87) PCT Pub. No.: WO2010/040412
PCT Pub. Date: Apr. 15, 2010

(65) Prior Publication Data
US 2011/0194526 A1 Aug. 11, 2011

(51) Int. Cl.
*H04W 4/00* (2009.01)
*H04W 24/02* (2009.01)
*H04L 12/24* (2006.01)
*H04L 12/26* (2006.01)

(52) U.S. Cl.
CPC ............ *H04W 24/02* (2013.01); *H04L 41/12* (2013.01); *H04L 43/0817* (2013.01)
USPC .......................................... 370/329; 370/328

(58) Field of Classification Search
USPC .................. 370/328, 329, 330, 331
See application file for complete search history.

(56) References Cited

U.S. PATENT DOCUMENTS

| | | | |
|---|---|---|---|
| 2002/0172208 A1* | 11/2002 | Malkamaki | 370/400 |
| 2003/0040335 A1 | 2/2003 | McIntosh et al. | 455/561 |
| 2004/0047333 A1* | 3/2004 | Han et al. | 370/350 |
| 2004/0052274 A1 | 3/2004 | Wang et al. | 370/468 |

(Continued)

FOREIGN PATENT DOCUMENTS

EP   1 324 509 A2   7/2003

OTHER PUBLICATIONS

3GPP TR 32.821 V0.1.3 (Oct. 2007), 3rd Generation Partnership Project: Technical Specification Group Services and System Aspects; Telecommunication management; Study of Self-Organising Networks (SON0 related OAM interfaces for Home NodeB (Release 8), pp. 1-15.

(Continued)

*Primary Examiner* — Hassan Phillips
*Assistant Examiner* — Siren Wei
(74) *Attorney, Agent, or Firm* — Harrington & Smith

(57) ABSTRACT

The invention is related to an apparatus including a receiver configured to receive communications from a control node of the macro cell in which the apparatus is located, the communications including system information about operation and maintenance support services the control node is able to provide and/or identity information of the control node; and a generator configured to generate messages including identity information of the apparatus, radio environment information, status information on connections to a core network and/or information on capabilities of the apparatus.

40 Claims, 2 Drawing Sheets

(56) References Cited

U.S. PATENT DOCUMENTS

Figure 1:
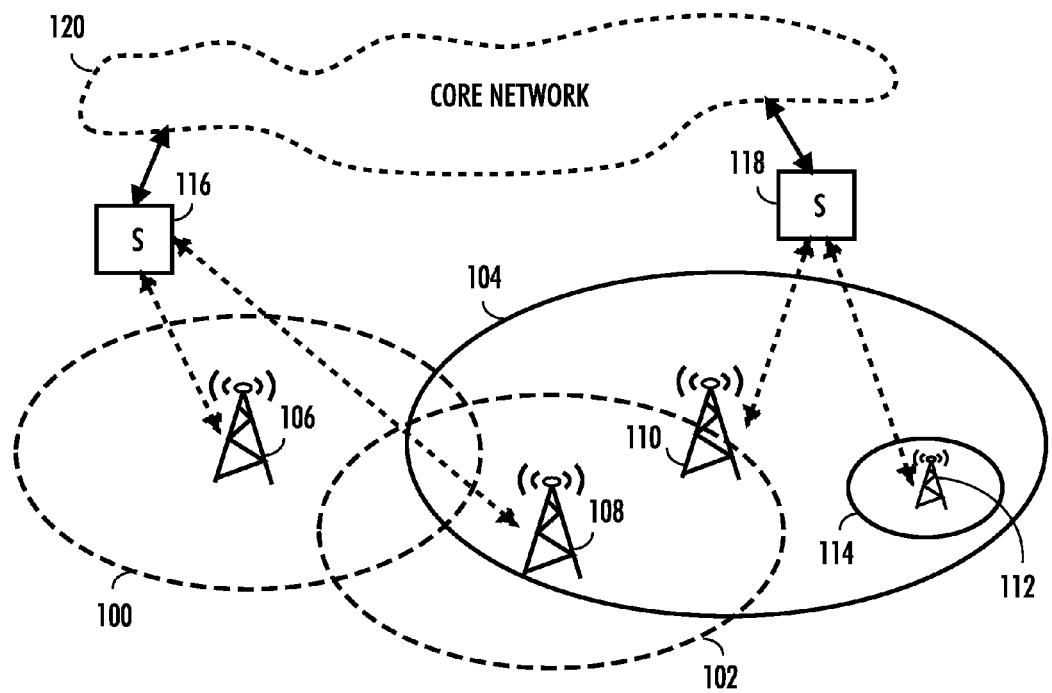

| | | | |
|---|---|---|---|
| 2004/0156386 A1* | 8/2004 | Atarashi et al. | 370/441 |
| 2005/0071768 A1* | 3/2005 | Araki et al. | 715/757 |
| 2005/0079865 A1* | 4/2005 | Ahn et al. | 455/434 |
| 2005/0288027 A1* | 12/2005 | Cho et al. | 455/442 |
| 2007/0149129 A1* | 6/2007 | Das et al. | 455/67.11 |
| 2007/0183323 A1* | 8/2007 | Hannu et al. | 370/230 |
| 2007/0210923 A1* | 9/2007 | Butler et al. | 340/572.8 |
| 2008/0069063 A1* | 3/2008 | Li et al. | 370/338 |
| 2008/0076412 A1 | 3/2008 | Khetawat et al. | 455/432.1 |
| 2008/0240024 A1* | 10/2008 | Rao et al. | 370/329 |

OTHER PUBLICATIONS

Haas, Z.J., "On the Relaying Capability of the Reconfigurable Wireless Networks", © 1997 IEEE, pp. 1148-1152.

* cited by examiner

APPARATUSES, SYSTEM, METHODS, AND COMPUTER PROGRAM PRODUCTS FOR NETWORK CONTROL

FIELD

The invention relates to apparatuses, system, methods, and computer program products for network control.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Modern communications systems provide a possibility to install so called "plug-and-play" node Bs in the network. For this purpose, a self-organizing network (SON) and flexible spectrum use (FSU) concepts have been launched.

Main targets of SON techniques are to minimize the need for network configuration and enable new types of communications networks, such as decentralized ad hoc networks. SON techniques enable "plug-and-play" operation by using home node Bs or local node Bs, self-tuning and reconfiguration of network parameters and structures affecting network operation.

FSU techniques provide means for utilizing and sharing spectrum resources among communication systems of the same or different operators serving in overlapping or even common spectrum and/or geographical area. Rules for co-operation are needed for ensuring a good user experience.

BRIEF DESCRIPTION

According to an aspect of the present invention, there is provided an apparatus comprising: a receiver configured to receive communications from a control node of the macro cell in which the apparatus is located, the communications comprising system information about operation and maintenance support services the control node is able to provide and/or identity information of the control node; and a generator configured to generate messages comprising identity information of the apparatus, radio environment information, status information on connections to a core network and/or information on capabilities of the apparatus.

According to an aspect of the present invention, there is provided an apparatus comprising: a transmitter configured to transmit system information about operation and maintenance support services the apparatus is able to provide and/or identity information of the apparatus; a receiver configured to receive identity information of at least one locally operable node, radio environment information of the at least one locally operable node, status information on connections to a core network of the at least one locally operable node and/or information on capabilities of the at least one locally operable node; and a selector configured to select, configure and/or reconfigure predetermined operation and maintenance functions for at least one of the locally operable nodes, the at least one of the locally operable nodes thus being able to operate in a desired operation mode for providing access services, if a previously established connection of the at least one of the locally operable nodes to the core network is inadequate.

According to an aspect of the present invention, there is provided a system, comprising: a transmitter configured to transmit system information about operation and maintenance support services the apparatus is able to provide and/or identity information of a control node; a receiver configured to receive communications from the control node, the communications comprising the system information and/or the identity information of the control node, a generator configured to generate messages comprising identity information of a locally operable node, radio environment information of the locally operable node, status information on connections to a core network and/or information on capabilities of the locally operable node, and a transmitter configured to transmit the messages; a receiver configured to receive the messages from at least one locally operable node; and a selector configured to select, configure and/or reconfigure predetermined operation and maintenance functions for the at least one of the locally operable nodes, the at least one of the locally operable nodes thus being able to operate in a desired operation mode for providing access services, if a previously established connection of the at least one of the locally operable nodes to the core network is inadequate.

According to an aspect of the present invention, there is provided a method, comprising: receiving communications from a control node of a macro cell serving a locally operable node, the communications comprising system information about operation and maintenance support services the control node is able to provide and/or identity information of the control node; and generating messages comprising identity information of the locally operable node, radio environment information of the locally operable node, status information on connections to a core network and/or information on capabilities of the locally operable node.

According to an aspect of the present invention, there is provided a method comprising: transmitting system information about operation and maintenance support services a serving control node is able to provide and/or identity information of the serving control node; receiving identity information of at least one locally operable node, radio environment information of the at least one locally operable node, status information on connections to a core network and/or information on capabilities of the at least one locally operable node; and selecting, configuring and/or reconfiguring predetermined operation and maintenance functions for at least one of the locally operable nodes, the at least one of the locally operable nodes thus being able to operate in a desired operation mode for providing access services, if a previously established connection of the at least one of the locally operable nodes to the core network is inadequate.

According to an aspect of the present invention, there is provided a computer program product embodied on a computer readable medium, configured to control a processor to perform a method, the method comprising: receiving communications from a control node of a macro cell serving a locally operable node, the communications comprising system information about operation and maintenance support services the control node is able to provide and/or identity information of the control node; and generating messages comprising identity information of the locally operable node, radio environment information of the locally operable node, status information on connections to a core network and/or information on capabilities of the locally operable node.

According to an aspect of the present invention, there is provided a computer program product embodied on a computer readable medium, configured to control a processor to perform a method, the method comprising: transmitting system information about operation and maintenance support services a serving control node is able to provide and/or identity information of the serving control node; receiving identity information of at least one locally operable node, radio environment information of the at least one locally operable node, status information on connections to a core network and/or information on capabilities of the at least one locally operable node; and selecting, configuring and/or reconfiguring predetermined operation and maintenance functions for at least one of the locally operable nodes, the at least one of the locally operable nodes thus being able to operate in a desired operation mode for providing access services, if a previously established connection of the at least one of the locally operable nodes to the core network is inadequate.

According to an aspect of the present invention, there is provided an apparatus comprising: means for receiving communications from a control node of a macro cell serving a locally operable node, the communications comprising system information about operation and maintenance support services the control node is able to provide and/or identity information of the control node; and means for generating messages comprising identity information of the locally operable node, radio environment information of the locally operable node, status information on connections to a core network and/or information on capabilities of the locally operable node.

According to an aspect of the present invention, there is provided an apparatus comprising: means for transmitting system information about operation and maintenance support services a serving control node is able to provide and/or identity information of the serving control node; means for receiving identity information of at least one locally operable node, radio environment information of the at least one locally operable node, status information on connections to a core network and/or information on capabilities of the at least one locally operable node; and means for selecting, configuring and/or reconfiguring predetermined operation and maintenance functions for at least one of the locally operable nodes, the at least one of the locally operable nodes thus being able to operate in a desired operation mode for providing access services, if a previously established connection of the at least one of the locally operable nodes to the core network is inadequate.

LIST OF DRAWINGS

Figure 2:
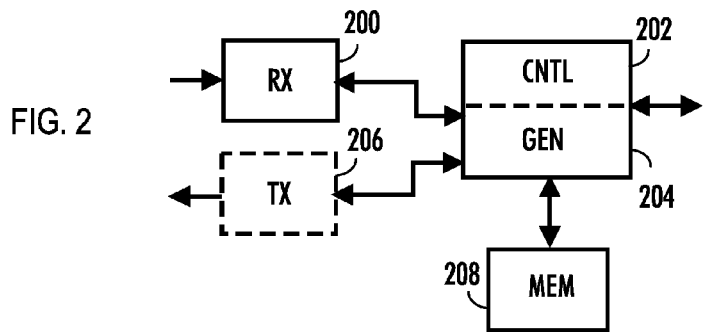
Figure 3:
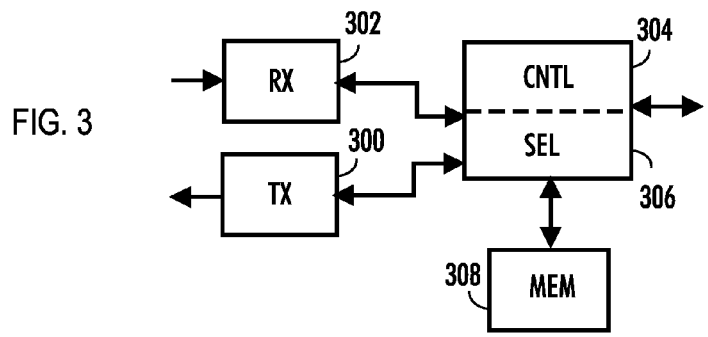
Figure 4:
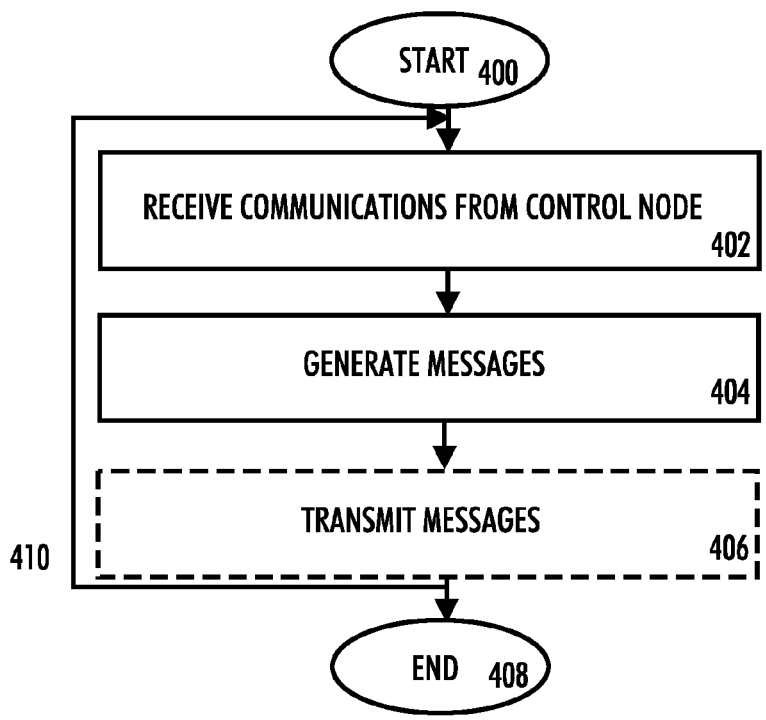
Figure 5:
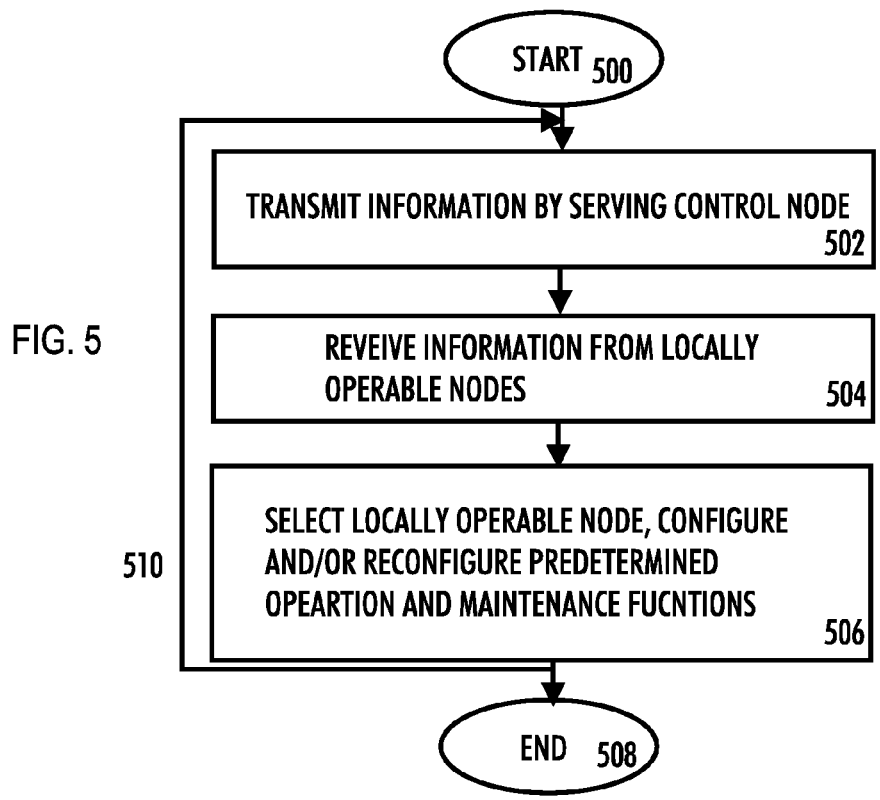

Embodiments of the present invention are described below, by way of example only, with reference to the accompanying drawings, in which
FIG. 1 illustrates an example of a system;
FIG. 2 illustrates an example of an apparatus;
FIG. 3 illustrates another example of an apparatus;
FIG. 4 is a flow chart; and
FIG. 5 is another flow chart.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user terminal, server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of a system architecture whereto the embodiments may be applied, an architecture based on Evolved UMTS terrestrial radio access (E-UTRA, UMTS=Universal Mobile Telecommunications System) without restricting the embodiment to such an architecture, however.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN), worldwide interoperability for microwave access (WiMAX), Bluetooth®, personal communications services (PCS) and systems using ultra-wideband (UWB) technology.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The system architecture of FIG. 1 shows cells 100, 102, 104 of two radio access networks based on LTE standard located in the same geographical area and operated by different operators. Node Bs 106 and 108 associated with the cells 100 and 102 are operated by operator A and node B 110 associated with the cell 104 is operated by operator B. The cell 104 depicts an umbrella cell under which home node B 112 forms a cell which may be a picocell.

A home node B (or a local node B) may be a private base station providing also functionality of a user device. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia device, personal digital assistant (PDA), handset.

The FIG. 1 illustrates only a simplified example. In practice, each network may include more cells, more operators may exist in the geographical area, more cells formed by home node Bs may be provided, the networks of two or more operators may overlap, the sizes and form of the cells vary from that depicted in FIG. 1, etc.

In FIG. 1, the node Bs 106, 108 of the first operator may be coupled to common servers of the network of the operator A 116, while node B 110 of the second operator may be coupled to common servers of the network of the operator B 118. The common servers 116, 118 may include operation and maintenance (O&M) and mobility management functionalities. Typically, the O&M functionalities include initial cell-level radio resources allocation, performance monitoring, etc. The mobility management functionalities may take care of routing the connections of user devices. The connections between the node Bs and the servers may be implemented by using Internet Protocol (IP) connections. The node Bs of the same operator may communicate with each other over an X2 interface and with mobility management entity over an S1 interface. These interfaces are described in more detail in E-UTRAN specifications and need thus not be explained herein.

It should be appreciated that the node Bs are also connectable to a core network (CN) 120 directly or via a radio network controller (not shown in the Figure). Depending on the system, the counterpart on the CN side can be a mobile services switching centre (MSC), a media gateway (MGW) or a serving GPRS (general packet radio service) support node (SGSN), home node B gateway (HNB-GW), mobility management entity and enhanced packet core gateway (MME/EPC-GW), etc. Also a direct communication between different node Bs over the air interface is possible by implementing a relay node concept, wherein a relay node may be considered as a special node B having wireless backhauls or, e.g., X2 and S1 interfaces relayed over the air interface by another node B. The communication system is also able to communicate with other networks, such as a public switched telephone network.

The embodiments are not, however, restricted to the system given as an example but a person skilled in the art may apply the solution to other communication systems provided with the necessary properties.

Typically, in a geographical area of a radio communication system there is provided a plurality of different kinds of radio cells as well as a plurality of radio cells as also shown in FIG. 1. Radio cells may be macro cells (or umbrella cells) which are large cells, usually having a diameter of up to tens of kilometers, or smaller cells such as micro- or picocells. A cellular radio system may be implemented as a multilayer network including macro-, micro and picocells. Each of the cells may be arranged to have a unique identity (such as a cell global Identity (CGI), cell identifier (CID) or physical layer cell identifier (PLCID)) for distinctly identifying the cells.

Recently, for fulfilling the need for improving the deployment and performance of communication systems, concept of "plug-and-play" node Bs has been introduced. Typically, a network which is able to use "plug-and-play" node Bs, includes, in addition to home node Bs, home node B gateway, or HNB-GW. The interface between the home node B (HNB) and the HNB-GW may be a Iu-h interface. A local node B (LNB) may provide similar kind of functionality as a HNB (but it is more generic).

Term "plug-and-play" is used herein to describe an apparatus which can be coupled to a network with a minimum configuration work, typically such an apparatus is a self-configuring device. For enabling "plug-and-play" devices a self-organizing network (SON) and flexible spectrum use (FSU) concepts have been launched. The SON concept is for instance known in connection to computer networks and neural networks. The FSU enables devices to use spectrum in a flexible manner. In future networks, more frequency bands will be needed for new high-bit-rate wireless services.

A home node B (sometimes being comparable to a femto or pico node) when coupled to broadband services providing an umbrella cell provides radio coverage for user devices. HNBs may provide the capabilities of a standard node B as well as the radio resource management functions of a standard radio network controller (RNC).

A HNB when serving as a "plug-and-play" node B may be a wireless access point purchased, installed and operated by a private user. Thus, the exact location of a HNB under the umbrella cell (or macro cell) when the HBN is wirelessly coupled to a network may not be known or it is of uncoordinated random nature which causes problems in network configuration.

A home node B may be used in a local area network (LAN) which is a computer network covering a relatively small geographical area, such as a home or office. Similar kinds of networks are personal area networks (PANs), campus area networks (CANs), or metropolitan area networks (MANs).

Another network system where HNBs are typically used is a Wide Area Network (WAN) which is a network covering a relatively broad area. A WAN may be defined to be a network whose coverage crosses metropolitan, regional, or national boundaries. Probably the best-known example is the Internet.

An example of a network system is also a mixed Local Area/Wide Area (LA/WA) scenario in which several cellular networks of the same radio access technology (e.g. E-UTRA) being operated by different operators are deployed in the same geographical area, such as a modern home-and-office building complex, and are using the same radio spectrum resources.

The mixed LA/WA scenarios may for instance refer to hierarchical cell structures, such as to a LTE/LTE or LTE/LTE-A co-existence or hot spots with overlay network. Within LA/WA coverage, HNBs of LNBs of the same or different networks may be placed and set up next to each other in a short distance in a spatially uncoordinated fashion.

The inter-cell and co-channel interferences affect the operation of individual cells in the neighbourhood of the network. The interference problems may be even more severe in LA/WA networks than in ordinary networks due to the use of "plug-and-play" HNBs and LNBs, the lack of coordination between different networks and/or the lack of cooperation between different operators. Reducing the effects of an initial set-up, reconfiguration and reset or removal of a "plug-and-play" device to the network is a challenging task.

Further, a need to balance the spectrum load among HNBs and/or LNBs and WNBs in LA/WA systems exists for obtaining an efficient spectrum sharing and overall radio resource utilization.

Thus there is a need for providing a control mechanism for such networks.

In this application, embodiments will be described in conjunction with cellular communications systems. However, it should be understood that the embodiments may be utilized in several kinds of systems, both wired and wireless.

An embodiment of a system according to the invention may comprise: In a control node, a transmitter configured to transmit system information about operation and maintenance support services the control node is able to provide and/or identity information of a control node (node B controlling a macro cell, in FIG. 1, 110), in a locally operable node in an umbrella cell controlled by the control node: a receiver configured to receive communications from the control node, the communications comprising system information and/or identity information of the control node, a generator configured to generate messages comprising identity information radio environment information, status information on current connections to a core network and/or information on apparatus capabilities of the locally operable node (a home node B or a local node B, in FIG. 1, 112), and a transmitter configured to transmit the messages. Further in the control node: a receiver configured to receive the messages from the locally operable nodes, and a selector configured to select, configure and/or reconfigure predetermined operation and maintenance functions for at least one of the locally operable node, the at least one locally operable node thus being able to operate in a desired operation mode for providing access services, if the previously established connection of the at least one locally operable node to a core network is inadequate. Further, the system may be configured to also select a locally operable node. The operation modes may be a home node B or local node B or relay node having wireless backhauls via the control node. The connections may be using the Internet protocol or any other transport protocol. Typically, in a hierarchical communication network, a backhaul portion of the network comprises intermediate links between a core, or backbone, of the network and other parts of the network, such as node Bs.

FIG. 2 is a simplified example of an apparatus able to serve as a HNB and/or LNB and capable to implement a mechanism for network control.

It should be understood that the apparatus is depicted herein as an example illustrating some embodiments. It is apparent to a person skilled in the art that the apparatus may also comprise other functions and/or structures. Although the apparatus has been depicted as one entity, different modules and memory may be implemented in one or more physical or logical entities.

The apparatus may be any server, node, host or corresponding component providing required functionality. The apparatus may also be a user device which is a piece of equipment or a device that associates, or is arranged to associate, the user device and its user with a subscription and allows a user to interact with a communications system. The user device presents information to the user and allows the user to input information. In other words, the user device may be any terminal capable of receiving information from and/or transmitting information to the network, connectable to the network wirelessly or via a fixed connection. Examples of the user devices include a personal computer, game console, laptop (notebook), personal digital assistant (PDA), pager, mobile television, mobile station, and line telephone.

The mobile station may refer to a portable computing device. Such computing devices include wireless mobile communication devices operating with or without a subscriber identification module (SIM), including, but not limited to, the following types of devices: a mobile phone, smart phone, personal digital assistant (PDA), multimedia device and handset. A wireless connection may be implemented with a wireless transceiver operating according to any suitable standard/non-standard wireless communication means.

The apparatus may also be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The electronic digital computer may also have an operating system, which may provide system services to a computer program written with the program instructions.

The apparatus of the example includes a receiver 200 configured to receive communications from a control node of the macro cell in which the apparatus is located, the communications comprising system information about operation and maintenance support services the control node is able to provide and/or identity information of the control node. In the example of FIG. 1, the control node is the node B 110 and the macro cell is the cell 104. The system information may include broadcast system information (SIB), such as indications about capability to support certain O&M and radio resource management related to cell configuration and inter-cell interference coordination (ICIC) of locally operable nodes in line with SON and FSU concepts.

The apparatus further includes a controller 202, wherein a generator 204 configured to generate messages comprising identity information of the apparatus and radio environment information of the apparatus, status information on current connections of the apparatus to a core network and/or information on capabilities of the apparatus. The connections may be using the Internet protocol or any other transport protocol. The identity information may be a unique authentic network identifier of the apparatus similar to a unique network identifier of an active user device that is used for communicating with the control node over the air interface, such as CGI and CID The radio environment information may be various kinds of information, such as a physical layer cell identifier (PLCID) of neighbouring cells, spectrum load, positioning or location information, etc. The main purpose of this information is that the network is able to assign a unique PLCID and initial cell-level radio resources to the apparatus based on the radio environment, wherein the apparatus is located. The status information of the apparatus may include status indications of its IP connections. The capabilities information in turn may include information for example on radio frequency, bandwidth, and/or reconfiguration capabilities to operate also as a relay node. This information is especially useful for the network to reconfigure certain HNBs and/or LNBs to work as relay nodes, if the apparatus has temporal difficulties especially with IP connections thus being unable to work as expected or specified. The information on the current status gives the network a possibility to reorganise its operation.

The controller may also include circuitry, such as processors and software for implementing other functionalities of the apparatus, such as audio and logic functions.

The generator may also be located in another unit or be a separate unit, such as a processor.

The apparatus may include a transmitter 206 configured to communicate the identity information and radio environment of the apparatus, the status information on the current IP connections to a core network and/or the information on the capabilities of the apparatus to the control node of the macro cell in which the apparatus is located. Upon reception of the information, the control node of the macro cell is able to be aware of cells locating in its coverage area, their radio environment and capabilities especially as a relay node.

The apparatus may also include a memory 208 for storing information, such as information received form the control node.

The apparatus may also include other parts and/or functionalities than those shown in FIG. 2, such as a connectivity program and user interface.

An embodiment of the apparatus may comprise means (200) for receiving communications from a control node of a macro cell serving a locally operable node, the communications comprising system information about operation and maintenance support services the control node is able to provide and/or identity information of the control node, and means (204, 208) for generating messages comprising identity information of the locally operable node, radio environment information of the locally operable node, status information on connections to a core network and/or information on capabilities of the locally operable node.

It should be understood that the apparatus may also solely comprise the controller, in which case the receiver and transmitter mean the capability of the controller to receive and transmit information to units or entities it is coupled to.

FIG. 3 is a simplified example of an apparatus capable to serve as node B controlling a macro cell, which in this application is called a control node or a serving control node being capable to implement a mechanism for network control.

It should be understood that the apparatus is depicted herein as an example illustrating some embodiments. It is apparent to a person skilled in the art that the apparatus may also comprise other functions and/or structures. Although the apparatus has been depicted as one entity, different modules and memory may be implemented in one or more physical or logical entities.

The apparatus may be any server, node, host or corresponding component providing required functionality.

The apparatus of the example includes a transmitter 300 configured to transmit system information about operation and maintenance (O&M) support services the control node is able to provide and/or identity information of the apparatus. The system information may include broadcast system information (SIB), such as indications about capability to support certain O&M and radio resource management related to cell configuration and inter-cell interference coordination (ICIC) of locally operable nodes in line with SON and FSU concepts.

Additionally, the apparatus may also transmit initial cell-specific resource allocation and interference budget to locally operable nodes. The resource allocation may include information on primary and secondary radio resource blocks or chunks with corresponding transmission power limits (also referred to as transmission power masking sequence) allocated for the locally operable nodes for data transmissions. Smart system frame number (SFN) offset assignment and transmission power settings for cell specific common and control channels may be provided.

The apparatus further includes a receiver 302 configured to receive identity information of locally operable nodes, radio environment information of the locally operable nodes, status information on connections to a core network of the locally operable nodes and/or information on capabilities of operable nodes. The locally operable nodes may be apparatuses capable to serve as a HNB and/or LNB.

Upon receiving the information, the apparatus when working as a control node of a macro cell is able to be aware of cells locating in its coverage area, their surrounding radio environment and capabilities, such as the capability as a relay node.

The identity information may be a unique authentic network identifier of the apparatus similar to a unique network identifier of an active user device that is used for communicating with the control node over the air interface, such as CGI and CID The radio environment information may be various kinds of information, such as a physical layer cell identifier (PLCID) of neighbouring cells, spectrum load, positioning of location information, etc. The main purpose of this information is that the network is able to assign a unique PLCID and initial cell-level radio resources to the apparatus based on the radio environment, wherein the apparatus is located. The status information of the locally operable apparatus may include status indications of its IP connections. The capabilities information in turn may include information for example on radio frequency, bandwidth, and/or reconfiguration capabilities. This information is especially useful for the network to reconfigure certain locally operable apparatuses to work as relay nodes, if a relay node concept is used and the locally operable apparatus has temporal difficulties with IP connections thus being unable to work as expected or specified. The information on the current status gives the network a possibility to reorganise its operation.

The apparatus also includes a selector 306 configured to select, configure and/or reconfigure predetermined operation and maintenance functions for at least one of the locally operable nodes, the at least one locally operable node thus being able to operate in a desired operation mode for providing access services, if the previously established connection of the at least one locally operable node to a core network is inadequate. The operation modes may be a home node B or local node B or relay node having wireless backhauls via the control node. The connections may be using the Internet protocol or any other transport protocol. The selector may further be configured to select at least one locally operable node for instance to replace a previously selected locally operable node. Determining a desired operation mode may be carried out as follows: for instance an operation mode is selected first, and then the operation and maintenance functions. Another option is that the operation and maintenance functions producing the desired operation mode are selected first. In the example of FIG. 3, the selector is located as a part of a controller 304.

The controller 304 may also include circuitry, such as processors and software for implementing other functionalities of the apparatus, such as radio resource management and logic functions.

The apparatus may also include a memory 308 for storing information such as received identity information, status information on current web connections and/or information on capabilities of the first locally operable node.

An embodiment of the apparatus may also comprise: means (300) for transmitting system information about operation and maintenance support services a serving control node is able to provide and/or identity information of the serving control node, means (302) for receiving identity information of at least one locally operable node, radio environment information of the at least one locally operable node, status information on connections to a core network and/or information on capabilities of the at least one locally operable node, and means (306, 308) for selecting, configuring and/or reconfiguring predetermined operation and maintenance functions for at least one of the locally operable node, the at least one of the locally operable node thus being able to operate in a desired operation mode, if a previously established connection of the at least one of the locally operable nodes to a core network is inadequate.

It should be understood that the apparatus may also solely comprise the selector, in which case the receiver and transmitter mean the capability of the selector to receive and transmit information to units or entities it is coupled to.

Next, an embodiment of a method will be described with reference to FIG. 4. The embodiment relates to the controlling of a network. The embodiment may run in any server, node, host or corresponding component, or in a user device, provided that the apparatus is capable to serve as a HNB and/or LNB and capable to implement a mechanism for network control.

The embodiment starts in block 400.

In block 402, communications from a control node of a serving macro cell are received. The communications include system information about operation and maintenance support services the control node is able to provide and/or identity information of the control node. In the example of FIG. 1, the control node is the node B 110 and the macro cell is the cell 104. The system information may include broadcast system information (SIB), such as indications about capability to support certain O&M and radio resource management related to cell configuration and inter-cell interference coordination (ICIC) of locally operable nodes in line with SON and FSU concepts.

In block 404, messages comprising identity information of locally operable nodes, radio environment information of the locally operable nodes, status information on connections to a core network and/or information on capabilities of a locally operable node are generated. The connections may be using the Internet protocol or any other transport protocol. The identity information may be a unique authentic network identifier of the apparatus similar to a unique network identifier of an active user device that is used for communicating with the control node over the air interface, such as CGI and CID The radio environment information may be various kinds of information, such as a physical layer cell identifier (PLCID) of neighbouring cells, spectrum load, positioning or location information, etc. The main purpose of this information is that the network is able to assign a unique PLCID and initial cell-level radio resources to the apparatus based on the radio environment, wherein the apparatus is located. The status information may include status indications of its IP connections. The capabilities information in turn may include information for example on radio frequency, bandwidth, and/or reconfiguration capabilities to operate as a relay node. This information is especially useful for the network to reconfigure certain HNBs and/or LNBs to work as relay nodes, if the apparatus has temporal difficulties especially with IP connections thus being unable to work as expected or specified. The information on the current status gives the network a possibility to reorganise its operation.

In block 406, the identity information, radio environment information, status information on IP connections to a core network and/or information on capabilities of the locally operable node may be transmitted to the control node of a serving macro cell. Upon reception of the information, the control node of the macro cell is able to be aware of cells locating in its coverage area, their surrounding radio environment and capabilities, such as a capability working as a relay node.

It should be understood that the user apparatus (locally operable node) wherein the embodiment may run, may also solely comprise the controller, in which case the receiver and transmitter mean the capability of the controller to receive and transmit information to units or entities it is coupled to.

The embodiment ends in block 408. The embodiment is repeatable in many ways, one example is depicted by arrow 410.

Next, an embodiment of a method will be described with reference to FIG. 5. The embodiment relates to the controlling of a network. The embodiment may run in any server, node, host or corresponding component provided that the apparatus is capable to serve as a node B controlling a macro cell, which in this application is called as a control node B or a serving control node, and capable to implement a mechanism for network control.

The embodiment starts in block 500.

In block 502, system information about operation and maintenance support services a serving control node is able to provide and/or identity information of the serving control node is transmitted. The system information may include broadcast system information (SIB), such as indications about capability to support certain O&M and radio resource management related to cell configuration and inter-cell interference coordination (ICIC) of locally operable nodes in line with SON and FSU concepts.

Additionally, initial cell-specific resource allocation and interference budget may be transmitted to locally operable nodes. The resource allocation may include information on primary and secondary radio resource blocks or chunks with corresponding transmission power limits (also referred to as transmission power masking sequence) allocated for the locally operable nodes for data transmissions. Smart system frame number (SFN) offset assignment and transmission power settings for cell specific common and control channels may be provided.

In block 504, identity information of locally operable nodes, radio environmental information of the locally operable nodes, status information on current IP connections to a core network and/or information on capabilities of the locally operable nodes are received. The locally operable nodes may be apparatuses capable to serve as a HNB or LNB.

Upon receiving the information, the control node of a macro cell is able to be aware of cells locating in its coverage area, their radio environment and capabilities especially as a relay node.

The identity information may be a unique authentic network identifier of the apparatus similar to a unique network identifier of an active user device that is used for communicating with the control node over the air interface, such as CGI and CID. The radio environment information may be various kinds of information, such as a physical layer cell identifier (PLCID) of neighbouring cells, spectrum load, positioning or location information, etc. The main purpose of this information is that the network is able to assign a unique PLCID and initial cell-level radio resources to the locally operable apparatus based on the radio environment, wherein the locally operable apparatus is located. The status information of the locally operable apparatus may include status indications of its IP connections. The capabilities information in turn may include information for example on radio frequency, bandwidth, and/or reconfiguration capabilities to operate also as a relay node. This information is especially useful for the network to reconfigure certain HNBs and/or LNBs to work as relay nodes, if the locally operable apparatus has temporal difficulties especially with IP connections thus being unable to work as expected or specified. The information on the current status gives the network a possibility to reorganise its operation.

In block 506, predetermined operation and maintenance functions are selected, configured and/or reconfigured for at least one of the locally operable nodes, the at least one locally operable node thus being able to operate in a desired operation mode for providing access services, if the previously established connection of the at least one locally operable node to a core network is inadequate. The operation modes may be a home node B or local node B or relay node having wireless backhauls via the control node. Further, at least one locally operable node may be selected for instance to replace a previously selected locally operable node. The connections may be using the Internet protocol or any other transport protocol. Determining a desired operation mode may be carried out as follows: for instance an operation mode is selected first, and then the operation and maintenance functions. Another option is that the operation and maintenance functions producing the desired operation mode are selected first.

It should be understood that the node B (control node) wherein the embodiment may run, may also solely comprise the selector, in which case the receiver and transmitter mean the capability of the selector to receive and transmit information to units or entities it is coupled to.

The embodiment ends in block 508. The embodiment is repeatable in many ways, one example is depicted by arrow 510.

The steps/points, signaling messages and related functions described above in FIGS. 4 and 5 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

An embodiment provides a computer program embodied on a distribution medium, comprising program instructions which, when loaded into an electronic apparatus, constitute the required functionality for carrying out embodiments of the control methods described above.

A computer program may include instructions for receiving communications from a control node of a serving macro cell wherein a locally operable node is located, the communications including system information about operation and maintenance support services the control node is able to provide and/or identity information of the control node, generating messages comprising identity information of the locally operable node, radio environment information of the locally operable node, status information on IP connections to a core network and/or information on capabilities of the locally operable node and further transmitting to the control node of a serving macro cell the identity information, radio environment information, status information on IP connections and/or information on capabilities of the locally operable node.

It should be understood that the user apparatus (locally operable node) wherein the computer program may run, may also solely comprise the controller, in which case the receiver and transmitter mean the capability of the controller to receive and transmit information to units or entities it is coupled to.

Another computer program may include instructions for transmitting system information about operation and maintenance support services a serving control node is able to provide and/or identity information of the serving control node is transmitted (the system information may include broadcast system information (SIB), such as indications about capability to support certain O&M and radio resource management related to cell configuration and inter-cell interference coordination (ICIC) of locally operable nodes in line with SON and FSU concepts), receiving identity information of at least one locally operable nodes, radio environmental information of the at least one locally operable nodes, status information on current IP connections to a core network and/or information on capabilities of the at least one locally operable nodes are received (the locally operable nodes may be apparatuses capable to serve as a HNB or LNB), and selecting, configuring and/or reconfiguring predetermined operation and maintenance functions for at least one of the locally operable nodes, the at least one locally operable node thus being able to operate in a desired operation mode, if the previously established connection of the at least one locally operable node to a core network is inadequate. The operation modes may be a home node B or local node B or relay node having wireless backhauls via the control node. Further, at least one locally operable node may be selected for instance to replace a previously selected locally operable node. The connections may be using the Internet protocol or any other transport protocol. Determining a desired operation mode may be carried out as follows: for instance an operation mode is selected first, and then the operation and maintenance functions. Another option is that the operation and maintenance functions producing the desired operation mode are selected first.

Additionally, the computer program may include instructions for transmitting initial cell-specific resource allocation and interference budget to locally operable nodes. The resource allocation may include information on primary and secondary radio resource blocks or chunks with corresponding transmission power limits (also referred to as transmission power masking sequence) allocated for the locally operable nodes for data transmissions. Smart system frame number (SFN) offset assignment and transmission power settings for cell specific common and control channels may be provided.

It should be understood that the node B (control node) wherein the computer program may run, may also solely comprise the selector, in which case the receiver and transmitter mean the capability of the selector to receive and transmit information to units or entities it is coupled to.

The computer programs may be in source code form, object code form, or in some intermediate form, and it may be stored in some sort of carrier (computer readable medium), which may be any entity or device capable of carrying the program. Such carriers include a record medium, computer memory, read-only memory, electrical carrier signal, telecommunications signal, and software distribution package, for example. Depending on the processing power needed, the computer programs may be executed in a single electronic digital computer or it may be distributed amongst a number of computers.

The steps/points, signaling messages and related functions described above in relation to computer program products are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor;
   memory storing computer program code;
   wherein the memory storing the computer program code is configured to, with the at least one processor, cause the apparatus to at least:
   configure a receiver to receive communications from a control node of a macro cell in which the apparatus is located, upon initial entry of the apparatus into the control area of the control node, the communications comprising system information about operation and maintenance support services the control node is able to provide, identity information of the control node, or both;
   generate messages comprising any one or more of identity information of the apparatus, radio environment information, status information on connections to a core network, or information on capabilities of the apparatus; and
   receive communication from the control node including a physical layer cell identifier and initial cell-level radio resources to be assigned to the apparatus, wherein the physical layer cell identifier identifies a cell in which the control node is located, wherein the physical layer cell identifier and the cell-level radio resources are determined based on the messages transmitted by the apparatus to the control node.

2. The apparatus of claim 1, further comprising a transmitter configured to transmit any one or more of the identity information of the apparatus, the radio environment information, the status information on the connections to the core network or the information on capabilities of the apparatus to the control node of the macro cell in which the apparatus is located.

3. The apparatus of claim 1, wherein the system information comprises broadcast system information, the broadcast system information comprising operation and maintenance and radio resource management information related to cell configuration and inter-cell interference coordination of the locally operable nodes.

4. The apparatus of claim 1, wherein a message comprising radio environment information comprises at least one of: a physical layer cell identifier of neighbouring cells, spectrum load, positioning and location information.

5. The apparatus of claim 1, wherein the information on capabilities of the apparatus comprises information on at least one of: a radio frequency, bandwidth, and reconfiguration capabilities to operate as a relay node.

6. The apparatus of claim 1, the apparatus being a home node B or local node B.

7. An apparatus comprising:
   at least one processor;
   memory storing computer program code;
   wherein the memory storing the computer program code is configured to, with the at least one processor, cause the apparatus to at least:
   transmit system information about operation and maintenance support services the apparatus is able to provide, identity information of the apparatus, or both;
   receive identity information of at least one locally operable node entering a control area for which the apparatus acts as a control node, radio environment information of the at least one locally operable node, status information on connections to a core network of the at least one locally operable node, or information on capabilities of the at least one locally operable node;
   transmit information to the locally operable node including a physical layer cell identifier and initial cell-level radio resources to be assigned to the locally operable node, wherein the physical layer cell identifier identifies a cell in which the apparatus is located, wherein the physical layer cell identifier and the cell-level radio resources are determined based on the messages by the apparatus from the locally operable node; and
   perform one or more of selecting, configuring, or reconfiguring predetermined operation and maintenance functions for at least one of the locally operable nodes, the at least one of the locally operable nodes thus being able to operate in a desired operation mode to provide access services, if a previously established connection of the at least one of the locally operable nodes to the core network is inadequate.

8. The apparatus of claim 7, wherein the operation modes are a home node B or local node B or relay node having wireless backhauls via the control node.

9. The apparatus of claim 7, wherein selecting comprises selecting at least one locally operable node to replace at least one previously selected locally operable node.

10. The apparatus of claim 7, wherein the system information comprises broadcast system information, the broadcast system information comprising operation and maintenance and radio resource management information related to cell configuration and inter-cell interference coordination of locally operable nodes.

11. The apparatus of claim 7 wherein transmitting comprises transmitting initial cell-specific resource allocation and interference budget to the locally operable node.

12. The apparatus of claim 7, wherein a message comprising radio environment information comprises at least one of: a physical layer cell identifier of neighbouring cells, spectrum load, positioning and location information.

13. The apparatus of claim 7, wherein the locally operable nodes are home node Bs or local node Bs.

14. The apparatus of claim 7, the apparatus being a node B configured to control a macro cell.

15. A system, comprising:
   a transmitter configured to transmit system information about operation and maintenance support services the apparatus is able to provide, identity information of a control node, or both;
   a receiver configured to receive communications from the control node, the communications comprising the system information, the identity information of the control node, or both;
   a generator configured to generate messages comprising any one or more of identity information of a locally operable node, radio environment information of the locally operable node, status information on connections to a core network, or information on capabilities of the locally operable node; and
   a transmitter configured to transmit the messages;
   a receiver configured to receive the messages from at least one locally operable node;
   a transmitter configured to transmit information to the locally operable node including a physical layer cell identifier and initial cell-level radio resources to be assigned to the locally operable node, wherein the physical layer cell identifier identifies a cell in which the transmitter is located, wherein the physical layer cell identifier and the cell-level radio resources are determined based on the messages received from the locally operable node; and a selector configured to perform any one or more of selecting, configuring, or reconfiguring selected operation and maintenance functions for at least one of the locally operable nodes, the at least one of the locally operable nodes thus being able to operate in a desired operation mode, if a previously established connection of the at least one of the locally operable nodes to the core network is inadequate.

16. A method, comprising:
receiving communications from a control node of a macro cell at a locally operable node upon initial entry of the locally operable node into a control area of the control node comprising system information about operation and maintenance support services the control node is able to provide, identity information of the control node, or both; and
generating messages comprising any one or more of identity information of the locally operable node, radio environment information of the locally operable node, status information on connections to a core network, or information on capabilities of the locally operable node; and
receive communication from the control node including a physical layer cell identifier and initial cell-level radio resources to be assigned to the locally operable node, wherein the physical layer cell identifier identifies a cell in which the control node is located, wherein the physical layer cell identifier and the cell-level radio resources are determined based on the messages transmitted by the apparatus to the control node.

17. The method of claim 16, further comprising:
transmitting the any one or more of the identity information of the apparatus, the radio environment information, the status information on connections to the core network or the information on capabilities of the apparatus to the control node of the macro cell in which the apparatus is located.

18. The method of claim 16, wherein the system information comprises broadcast system information, the broadcast system information comprising operation and maintenance and radio resource management information related to cell configuration and inter-cell interference coordination of locally operable nodes.

19. The method of claim 16, wherein a message comprising radio environment information comprises at least one of: a physical layer cell identifier of neighbouring cells, spectrum load, positioning and location information.

20. The method of claim 16, wherein the information on capabilities of the apparatus comprises information on at least one of: a radio frequency, bandwidth, and reconfiguration capabilities to operate as a relay node.

21. A method comprising:
transmitting system information about operation and maintenance support services a serving control node is able to provide, identity information of the serving control node, or both;
receiving identity information of at least one locally operable node entering a control area of the control node, radio environment information of the at least one locally operable node, status information on connections to a core network or information on capabilities of the at least one locally operable node;
transmitting information to the locally operable node including a physical layer cell identifier and initial cell-level radio resources to be assigned to the locally operable node, wherein the physical layer cell identifier identifies a cell in which the control node is located, wherein the physical layer cell identifier and the cell-level radio resources are determined based on the messages by the apparatus from the locally operable node; and
performing one or more of selecting, configuring or reconfiguring selected operation and maintenance functions for at least one of the locally operable nodes, the at least one of the locally operable nodes thus being able to operate in a desired operation mode to provide access services, if a previously established connection of the at least one of the locally operable nodes to the core network is inadequate.

22. The method of claim 21, wherein the operation modes are a home node B or local node B or relay node having wireless backhauls via the control node.

23. The method of claim 21, further comprising selecting a locally operable node to replace at least one previously selected locally operable node.

24. The method of claim 21, wherein the system information comprises broadcast system information, the broadcast system information comprising operation and maintenance and radio resource management information related to cell configuration and inter-cell interference coordination of locally operable nodes.

25. The method of claim 21, further comprising: transmitting initial cell-specific resource allocation and interference budget to the locally operable node.

26. The method of claim 21, wherein a message comprising radio environment information comprises at least one of: a physical layer cell identifier of neighbouring cells, spectrum load, positioning and location information.

27. The method of claim 21, wherein the locally operable nodes are home node Bs or local node Bs.

28. A non-transitory computer readable medium storing a program of instructions, execution of which by a processor configures an apparatus to at least:
receive at least one communication from a control node of a macro cell upon initial entry of the apparatus into the control area of the control node, the communications comprising system information about operation and maintenance support services the control node is able to provide, or identity information of the control node, or both;
generate at least one message comprising any one or more of identity information of the locally operable node, radio environment information of the locally operable node, status information on connections to a core network, or information on capabilities of the locally operable node; and
receive communication from the control node including a physical layer cell identifier and initial cell-level radio resources to be assigned to the apparatus, wherein the physical layer cell identifier identifies a cell in which the control node is located, wherein the physical layer cell identifier and the cell-level radio resources are determined based on the messages transmitted by the apparatus to the control node.

29. The computer readable medium of claim 28, wherein the system information comprises broadcast system information, the broadcast system information comprising operation and maintenance and radio resource management information related to cell configuration and inter-cell interference coordination of locally operable nodes.

30. The computer readable medium of claim 28, wherein a message comprising radio environment information comprises at least one of: a physical layer cell identifier of neighbouring cells, spectrum load, positioning and location information.

31. The computer readable medium of claim 28, the information on capabilities of the apparatus comprises information on at least one of: a radio frequency, bandwidth, and reconfiguration capabilities to operate as a relay node.

32. A non-transitory computer readable medium storing a program of instructions, execution of which by a processor configures an apparatus to at least:
   transmit system information about operation and maintenance support services a serving control node is able to provide, identity information of the serving control node, or both;
   receive any one or more of identity information of at least one locally operable node entering a serving area of the control node, radio environment information of the at least one locally operable node, status information on connections to a core network or information on capabilities of the at least one locally operable node;
   transmit information to the locally operable node including a physical layer cell identifier and initial cell-level radio resources to be assigned to the locally operable node, wherein the physical layer cell identifier identifies a cell in which the serving control node is located, wherein the physical layer cell identifier and the cell-level radio resources are determined based on the messages by the apparatus from the locally operable node; and
   perform any one or more of selecting, configuring or reconfiguring predetermined operation and maintenance functions for at least one of the locally operable nodes, the at least one of the locally operable nodes thus being able to operate in a desired operation mode for providing access services, if a previously established connection of the at least one of the locally operable nodes to the core network is inadequate.

33. The computer readable medium of claim 32, wherein the operation modes are a home node B or local node B or relay node having wireless backhauls via the control node.

34. The computer readable medium of claim 32, further comprising selecting a locally operable node to replace at least one previously selected locally operable node.

35. The computer readable medium of claim 32, wherein the system information comprises broadcast system information, the broadcast system information comprising operation and maintenance and radio resource management information related to cell configuration and inter-cell interference coordination of locally operable nodes.

36. The computer readable medium of claim 32, further comprising: transmitting initial cell-specific resource allocation and interference budget to the locally operable node.

37. The computer readable medium of claim 32, wherein a message comprising radio environment information comprises at least one of: a physical layer cell identifier of neighbouring cells, spectrum load, positioning and location information.

38. The computer readable medium of claim 32, wherein the locally operable nodes are home node Bs or local node Bs.

39. An apparatus comprising:
   means for receiving communications from a control node of a macro cell serving a locally operable node upon initial entry of the apparatus into the control area of the control node, the communications comprising system information about operation and maintenance support services the control node is able to provide, identity information of the control node, or both;
   means for generating messages comprising any one or more of identity information of the locally operable node, radio environment information of the locally operable node, status information on connections to a core network, or information on capabilities of the locally operable node; and
   means for receiving communication from the control node including a physical layer cell identifier and initial cell-level radio resources to be assigned to the apparatus, wherein the physical layer cell identifier identifies a cell in which the control node is located, wherein the physical layer cell identifier and the cell-level radio resources are determined based on the messages transmitted by the apparatus to the control node.

40. An apparatus comprising:
   means for transmitting system information about operation and maintenance support services a serving control node is able to provide, identity information of the serving control node, or both;
   means for receiving any one or more of identity information of at least one locally operable node initially entering a service area of the control node, radio environment information of the at least one locally operable node, status information on connections to a core network or information on capabilities of the at least one locally operable node;
   means for transmitting information to the locally operable node including a physical layer cell identifier and initial cell-level radio resources to be assigned to the locally operable node, wherein the physical layer cell identifier identifies a cell in which the serving control node is located, wherein the physical layer cell identifier and the cell-level radio resources are determined based on the messages by the apparatus from the locally operable node; and
   means for performing any one or more of selecting, configuring or reconfiguring predetermined operation and maintenance functions for at least one of the locally operable nodes, the at least one of the locally operable nodes thus being able to operate in a desired operation mode, if a previously established connection of the at least one of the locally operable nodes to the core network is inadequate.

* * * * *